United States Patent [19]

Shepherd, Jr. et al.

[11] Patent Number: 4,643,253
[45] Date of Patent: Feb. 17, 1987

[54] OIL RECOVERY PROCESS

[75] Inventors: Lawrence H. Shepherd, Jr.; William J. DeWitt; Gerhard O. Kuehnhanss, all of Baton Rouge, La.

[73] Assignee: Ethyl Corporation, Richmond, Va.

[21] Appl. No.: 202,009

[22] Filed: Oct. 29, 1980

[51] Int. Cl.⁴ ............................................. E21B 43/22
[52] U.S. Cl. .............................. 166/274; 252/8.55 D; 252/8.554
[58] Field of Search ............. 252/8.55 D; 260/513 B, 260/513 R; 166/274, 275

[56] References Cited

U.S. PATENT DOCUMENTS

| | | | |
|---|---|---|---|
| 2,241,421 | 5/1941 | Price et al. | 260/513 |
| 2,535,677 | 12/1950 | Hollander et al. | 260/513 |
| 3,469,630 | 9/1969 | Hurd et al. | 252/8.55 X |
| 3,827,497 | 8/1974 | Dycus et al. | 252/8.55 X |
| 3,977,471 | 8/1976 | Gale et al. | 252/8.55 X |

Primary Examiner—Herbert B. Guynn
Attorney, Agent, or Firm—Donald L. Johnson; John F. Sieberth; J. D. Odenweller

[57] ABSTRACT

Ether disulfonates or mixtures of ether monosulfonates and ether disulfonates are disclosed as useful surfactants in the recovery of oil.

16 Claims, No Drawings

OIL RECOVERY PROCESS

BACKGROUND OF THE INVENTION

1. Field of the Invention

This invention relates to the use of surfactant salts to enhance the recovery of oil from oil-bearing formations. In particular, the invention relates to the use of surfactant salts which have stability in brines and stability in the presence of polymers used as mobility improvers.

Waterflooding is a well-known technique for the secondary or tertiary recovery of oil from subterranean formations from which oil has previously been recovered by primary techniques such as pumping, natural flow and the like. In many areas the only economic source of water is a brine and the brine usually contains various metal ions such as calcium, magnesium and the like. As used herein brine means a sodium chloride brine.

The use of surfactants to reduce the interfacial tension between the water and the oil to be displaced from the formation is also well known and the literature is replete with different surfactants and combinations thereof useful in waterflooding processes. It is well known that the effectiveness of any given surfactant material varies considerably with such factors as temperature of the water, the amount of salt in the water, the amount and type of metal ions in the water and the like.

The invention relates to the recovery of oil from subterranean oil reservoirs and also to improved waterflooding operations involving the injection into a high temperature reservoir of an aqueous liquid formulated through the use of an ether sulfonate surfactant.

DESCRIPTION OF THE PRIOR ART

The art in the foregoing field is voluminous and involves the use of one, two, three or more surfactants, individually or in combination. Such art is typified, for example, by U.S. Pat. Nos. 3,308,068; 3,508,612; 3,527,301; 3,714,062; 3,777,818; 3,782,472; 3,827,497; 3,946,814; 4,018,278; 4,110,229; 4,120,358; and the art cited therein, all of which is incorporated herein by reference. It is evident from the foregoing typical art that an extremely wide variety of surfactants and auxiliary materials are known. It is also known that the effectiveness and longevity of various materials depend upon numerous factors such as temperature, and the presence or absence of salt and of metal ions contributed by the formation, or otherwise.

The compositions disclosed in U.S. Pat. No. 3,827,497 have limitations in regard to temperature since they are based on or include the salts of sulfated oxyalkylated alcohol. Salts which contain C-O-S linkage are known to be hydrolytically unstable at elevated temperatures. Sulfonates of U.S. Pat. No. 3,827,497 are ethyl sulfonates wich are difficult to produce.

In the recovery of oil from oil-bearing reservoirs, it usually is possible to recover only minor portions of the original oil in place by primary recovery methods which utilize only the natural forces present in the reservoir. Thus, a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

Various chemical additives may be employed in the injected water. For example, the injected water may contain surface-active agents which effect a reduction in the oil-water interfacial tension, thus enhancing the microscopic displacement of the oil by the water. Another widely used technique involves the addition of thickening agents which increase the viscosity of the injected water, normally to a value at least equal to that of the reservoir oil, in order to arrive at a favorable mobility ratio between the oil and water in order to increase the microscopic displacement efficiency of the waterflood.

Surfactants used predominantly in decreasing the oil-water interfacial tension have been petroleum sulfonates and synthetic alkyl or alkylaryl sulfonates. While these surfactants are extremely effective in reducing the interfacial tension to desired low values within the millidyne per centimeter range, their usefulness is limited since they lack stability in the so-called "high brine" environments. These surfactants tend to precipitate in the presence of monovalent salts such as sodium chlorides at concentrations in excess of about 2 to 3 weight percent and in the presence of divalent metal ions such as calcium and magnesium ions at concentrations of about 50 to 100 parts per million and above.

In view of the limitations thus imposed on the use of the petroleum sulfonate type surfactants, various ether-linked anionic surfactants which are stable in high brine environments have been proposed for use in surfactant waterflooding. Thus, U.S. Pat. Nos. 3,827,497 and 3,890,239 to Dycus et al disclosed surfactant compositions and a surfactant waterflooding process in which a sulfonated oxyalkylated alcohol is employed in conjunction with a petroleum sulfonate or in which a sulfonated or sulfated oxyalkylated alcohol is employed in conjunction with a petroleum sulfonate and a polyalkylene glycol alkyl ether. The alcohol portion of the ether-linked sulfonate is usually derived from aliphatic alcohols containing 8-20 carbon atoms but may be derived from other hydroxy compounds including alkyl phenols containing 5-20 carbon atoms per alkyl group. The oxyalkyl portion is usually polyoxyalkyl, the radical repeating itself 2 to 15 times and preferably from 2 to 8 times. The brine in which the surfactant systems of Dycus et al are employed will usually contain 0.5–8 percent sodium chloride and brines under about 6 percent sodium chloride are said to be most suitable. The brine will often contain 50–5,000 ppm polyvalent metal ions such as calcium and/or magnesium.

U.S. Pat. No. 3,977,471 to Gale et al discloses surfactant waterflooding employing certain alkylaryl ether-linked sulfonates which are said to effectively reduce the oil-water intefacial tension in a high temperature reservoir and in a high salinity environment. The alkylaryl lipophilic base is benzene, toluene, or xylene substituted with an alkyl group containing from 6 to 24 carbon atoms. The ether linkage is derived from ethylene oxide or propylene oxide and contains from 1 to 20 alkylene oxide units. The surfactants disclosed in Gale et al are said to be particularly useful in reservoirs having high salinity brine (i.e., salinities of 2% or more) and have good tolerance to high salinity. For example, dodecyl dimethyl benzene ether $(EO)_4$ propane sulfonate is said to exhibit a high degree of surface activity with oil and water in saline solutions containing from 7 to 14 percent by weight sodium chloride. In addition to the use of the ether-linked sulfonates in aqueous solutions, the patentees disclose that they may be used in liquid hydrocarbon solvents or in microemulsions. Specifically disclosed are microemulsion systems composed of 91 to 93 percent water containing 6 percent sodium chloride, 5 percent oil, 1 to 3 percent dodecyl dimethyl benzene ether (EO)$_{4.2}$ propane sulfonate, and 1 percent butyl alcohol.

Another surfactant waterflooding process involving the use of brine-tolerant ether-linked sulfonates is disclosed in U.S. Pat. No. 4,018,278 to Shupe. The surfactants employed in Shupe include sulfonated ethoxylated aliphatic alcohols and alkyl phenols and are said to be usable in formations having temperatures in excess of 120° F. The alkyl chain in the alkyl or alkylaryl radical has from 8 to 20 carbon atoms and the ether linkage contains from 1 to 20 ethylene oxide units. The patentee claims the use of the surfactant in a solution having a salinity of at least about 6.0 percent by weight and discloses the use of sulfonated polyethoxylated dodecyl phenol in a core displacement test in a solution having a salinity of 183,000 ppm and a total hardness of 9400 ppm. Shupe also describes a field example involving the injectin of a surfactant solution in a formation, having a temperature of 240° F. and containing water having a salinity of approximately 205 kilograms per cubic meter and approximately 6,000 ppm calcium. In the field example, a 10 percent pore volume slug of surfactant solution is injected and followed by an aqueous solution of 0.5 percent by weight ppolysaccharide to achieve a favorable mobility ratio.

SUMMARY OF THE INVENTION

In accordance with the present invention, methods of using surfactant salt compositions in oil recovery are disclosed. Salts of sulfated oxyalkylated alcohol are avoided. Ether sulfonate salts which are easily produced and which have improved hydrolytic stability at elevated temperatures, especially in comparison to sulfated ethoxylated alcohols are used in an oil recovery process. The present process provides compositions which have stability in brines and stability in the presence of polymers used as mobility improvers. Such property is of particular value where the oil-bearing formations are located deep within the earth's crust and contact with brine and alkaline earth metal ions is likely.

The present process is especially useful in ternary combination with polyalkylene glycol alkyl ethers and a surfactant salt of an organic sulfonate such as those described in U.S. Pat. No. 3,827,497.

Compositions used in the present invention are ether sulfonates having the following structural formula:

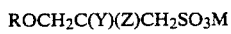

wherein R is a hydrocarbon group having from about 6 to about 24 carbon atoms. The hydrocarbon group may be either paraffinic or aromatic and includes straight chained or branched alkyl groups, alkaryl groups, arylalkyl groups and alkylarylalkyl groups. Linear alkyl groups having from 6 to 18 carbon atoms are preferred and alkyl groups of 10 to 14 carbon atoms are most preferred. Y is hydrogen, SO$_2$M or SO$_3$M. Z is hydrogen or a methyl group. M is an alkali metal, alkylammonium or ammonium cation. Sodium is the preferred alkali metal. Preferred compounds are C$_{10-14}$H$_{21-29}$OCH$_2$CH$_2$CH$_2$SO$_2$Na,

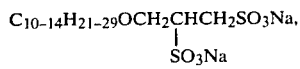

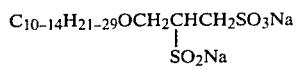

or mixtures thereof.

The foregoing salt compositions are generally used in aqueous media.

The present invention is particularly directed to an improved process for recovering oil from a subterranean oil-bearing formation wherein the improvement consists in using the foregoing ether sulfonate salts.

In another aspect, the present invention relates to a method of recovering oil from a subterranean oil-bearing formation which comprises injecting into the formation a saline solution containing a mixture of the following components:

(a) from 0.5 to 15 percent by weight based on said solution of a surfactant salt of an organic sulfonate;

(b) from 0.25 to 10 percent by weight based on said solution of a polyalkylene glycol alkyl ether; and, (c) from 0.25 to 10 percent by weight based on said solution of a salt of the formula:

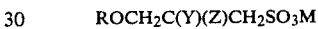

wherein R is a hydrocarbon group having from about 6 to about 24 carbon atoms. The hydrocarbon groups may be either paraffinic or aromatic and includes straight chained or branched alkyl groups, alkaryl groups, arylalkyl groups and alkylarylalkyl groups. Linear alkyl groups having from 6 to 18 carbon atoms are preferred and alkyl groups of 10 to 14 carbon atoms are most preferred. Y is hydrogen, SO$_2$M or SO$_3$M. Z is hydrogen or a methyl group. M is an alkali metal, alkylammonium or ammonium cation. Sodium is the preferred alkali metal; and flooding the formation with a saline solution to effect oil recovery therefrom. Preferably, Component (a) is an alkali metal salt of a petroleum sulfonate, Component (b) is diethylene glycol hexyl ether and Component (c) is an alkyl ether sulfonate. Preferably, the amounts of Components (a), (b) and (c) are, respectively, 2–10 percent, 1–8 percent and 1–8 percent by weight. Preferably, the saline solution used in flooding the formation contains a polymer to improve the mobility thereof, such polymer preferably being a polysaccharide.

DESCRIPTION OF THE PREFERRED EMBODIMENTS

The invention provides a method for obtaining oil from a subterranean oil-bearing formation, which method comprises contacting the formation with a compound of the formula:

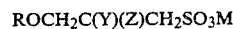

wherein R is a hydrocarbon group having from about 6 to about 24 carbon atoms. The hydrocarbon group may be either paraffinic or aromatic and includes straight chained or branched alkyl groups, alkaryl groups, arylalkyl groups and alkylarylalkyl groups. Linear alkyl groups having from 6 to 18 carbon atoms are preferred and alkyl groups of 10 to 14 carbon atoms are most preferred. Y is hydrogen, $SO_2M$ or $SO_3M$. Z is hydrogen or a methyl group. M is an alkali metal, alkylammonium or ammonium cation, and then recovering at least a part of the available oil.

By the use of the ether sulfonate salts, compositions are provided which are easily produced and which have improved hydrolytic stability at elevated temperatures, especially in comparison to sulfated ethoxylated alcohols. As a result the present compositions are resistant to hydrolysis during the prolonged time the oil recovery surfactant compositions are required to be in the ground in contact with brine and alkaline earth metal ions. This property is of particular value in situations where the oil-bearing formations are located comparatively deep within the earth's crust.

In general, the salts of the present invention are used in aqueous solutions so as to facilitate the introduction thereof into oil bearing formations in the earth. Typical solutions contain from about 0.005 weight percent to about a saturation amount of the preferred salt in water; however, these concentrations may vary depending upon the method chosen for making the solutions and introducing them into the formation. Solutions are introduced into the formation in combinations such as with surfactant salts of organic sulfonates and of polyalkylene glycol alkyl ethers. Such ternary systems in water are frequently preferred for injection. Such systems can be used with water which contains alkali metal halide such as sodium chloride in solution, viz, brine, as well as with water containing alkaline earth metal ions, either with or without the alkali metal halide of the brine.

A preferred process in accordance with the present invention involves the recovery of oil from a subterranean oil-bearing formation by injecting into the formation a saline solution containing the ether sulfonate of the present invention, a surfactant salt of an organic sulfonate and a polyalkylene glycol alkyl ether and then flooding the formation with an aqueous medium is frequently a brine or saline solution to minimize costs inherent in obtaining non-saline aqueous solutions in the field.

The organic sulfonate components useful in connection with the present invention are typically as described in U.S. Pat. No. 3,827,497; however, preferably those having the unstable structures are avoided where utmost stability of the overall system is desired. Preferably, sulfonates are used which are readily available commercially such as "Bryton Chemical F467", "Witco Chemical TRS-10". Suitable sulfonates are usually and preferably metal salts of alkaryl sulfonates, preferably alkali metal salts and alkyl benzene sulfonates containing 12 to 30 carbon atoms. Suitable sulfonates also can be aliphatic sulfonates, alkylated naphthaline sulfonates and the like, the essential requirement being that they have surfactant properties. The cationic portion of such sulfonates can be ammonium or alkylammonium as well as alkali metal but is usually and preferably sodium. The molecular weight of the organic sulfonate surfactant is usually in the range of 300–600, preferably 350–525. These materials can be prepared by well known procedures such as those described in U.S. Pat. No. 3,308,068. They can be prepared synthetically or from petroleum.

The polyalkylene glycol monoalkyl ethers are widely available commercially. The alkylene group is usually ethylene but may be propylene or others up to about 5 carbon atoms. It can repeat itself up to about 10 times (i.e. the "poly" can be up to about 10) but usually repeats itself 2-6 times, more usually twice, e.g. diethylene. It should also be understood that for any specified polyalkylene, the number of alkylene units is either exactly as specified or varies, but the average is as specified. This same principle applies also to the alkyl group. Preferably, the glycol portion is diethylene glycol. The alkyl group will normally contain 2-12 carbon atoms, preferably 4-10. In general the more alkylene units or the longer the alkylene unit, the longer the alkyl group should be. The preferred component is diethylene glycol hexyl ether. These materials are available commercially or can be made by known procedures.

The ether sulfonate may be prepared by reacting an organic compound containing a hydroxyl group such as an alcohol or phenol with an organic halide to produce an ether. The ether is then reacted with a base such as sodium hydroxide and sulfur dioxide or other suitable sulfur containing compound such as an alkali metal bisulfite, meta bisulfite or sulfite, in the presence of a suitable catalyst to produce the ether sulfonate and the corresponding sulfinate/sulfonate. The ammonium or alkylammonium salts of said sulfur compounds may also be used. Any ether sulfinates present may then be oxidized to the corresponding ether sulfonates.

The organic hydroxy compound used has the following structural formula:

ROH wherein R is as defined hereinbefore and is preferably a linear alkyl containing 6 to 18 carbon atoms.

The organic halide used in the process has the following structural formula:

$$XCH_2\underset{Z}{C}=CH_2$$

wherein X is halogen, i.e. bromine, chlorine or iodine with chlorine being preferred, and Z is hydrogen or a methyl group.

The organic ether produced by the reaction of the organic hydroxy compound and the organic halide has the following structural formula:

$$ROCH_2\underset{Z}{C}=CH_2$$

wherein R and Z are defined as above.

In more detail, a preferred method of preparing the ether sulfonates employed in this invention involves preparing materials of the type having the formula:

$$ROCH_2C(Y)(Z)CH_2SO_3M$$

wherein R is preferably a $C_6$ to $C_{18}$ alkyl group, more preferably a $C_{10}$ to $C_{14}$ alkyl group, and most preferably a mixture of $C_{10}$ to $C_{14}$ alkyl groups, a $C_6$ to $C_{24}$ alkaryl group, a $C_6$ to $C_{24}$ arylalkyl group; Y is H, $SO_2M$ or $SO_3M$; M is alkali metal, ammonium or alkylammonium cation and preferably Na; and Z is H or $CH_3$.

In the process, a hydroxy-containing compound of the formula:

ROH wherein R is as defined above, is reacted with an unsaturated organic halide having the formula:

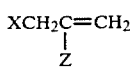

wherein X is a halide and peferably chlorine, and Z is defined as above, in the presence of a base such as sodium hydroxide and a suitable phase transfer catalyst such as tributylmethylammonium chloride to produce an ether of the formula below, sodium chloride and water:

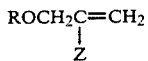

wherein R and Z are defined as above.

The ether is then reacted with sodium hydroxide and sulfur dioxide in an isopropyl alcohol and water solution and in the presence of a suitable catalyst such as tertiary butyl perbenzoate to produce the ether sulfonate, and the corresponding sulfinate/sulfonate.

The preferred alcohols which may be employed as reactants in preparing the ethers are those having the general formula:

ROH wherein R is a $C_6$ to $C_{18}$ radical or mixtures thereof. A most preferred alcohol composition is a mixture of 25% $C_{10}$/50%$C_{12}$/25%$C_{14}$ alcohols.

The starting hydroxy-containing compounds used to produce the ethers of the invention may be chosen from a wide variety of available compounds. Thus, for example, natural or synthetic fatty alcohols preferably containing from about 6 to about 18 carbon atoms may be used and include such alcohols as hexyl, octyl, decyl, dodecyl, tetradecyl, hexadecyl, and octadecyl as well as alcohols such as lauryl, myristyl, cetyl, stearyl, and tallow, and mixtures of any of these synthetic and/or natural alcohols.

Alcohols having an odd number of carbon atoms as well as those having an even number of carbon atoms are also suitable. An example of the former are those alcohols produced by hydroformylation of even carbon numbered olefins. Combinations and/or mixtures of the various types of alcohols are also suitable.

Particularly useful alcohols here include Ziegler-type primary linear alcohols prepared from trialkylaluminum mixtures made by way of ethylene polymerization, subsequent oxidation, and hydrolysis of the resultant aluminum alkoxides as set out in U.S. Pat. No. 3,598,747 and other alcohols of this type.

Other suitable hydroxy compounds are alkyl substituted phenols and aryl alcohols. Such reactants include, for example, nonylphenol, dinonylphenol, cresol and the like. Particularly preferred are hydroxy compounds having the following structural formula:

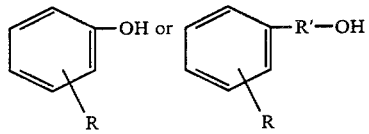

wherein R is an alkyl group containing from 1 to 18 carbon atoms, and R' is an alkylene group containing 1 to 18 carbon atoms.

Both allyl halides and methyl substituted allyl halides may be used as reactants. The term "allyl halide" as used herein includes both allyl halide and methallyl halide.

The first step in preparing the ether sulfonates used in the process of this invention involves reacting an alcohol or hydroxy compound of the type described above with an allyl halide. Preferred halides are allyl chloride, allyl bromide, methallyl chloride and methallyl bromide. This step is carried out in the presence of a strong base such as an alkali metal hydroxide and a suitable phase transfer catalyst such as tri-butylmethylammonium chloride. Preferred bases are sodium hydroxide and potassium hydroxide. The reaction proceeds best using anhydrous sodium hydroxide in pellet or flaked form. Conversions of alcohol are often as high as 95%. Only a few percent of by-product diallylether is formed.

The allyl halide and hydroxy-containing compound can be reacted on a mole per mole basis; however, an excess of allyl halide is preferred. An excess of base is normally employed; however, the amount used may range from about 0.5 molar equivalents to about 5.0 molar equivalents per molar equivalent of the hydroxy-containing compound.

The step involving formation of the allyl ether compound may be carried out over a wide range of process variables of time, temperature, pressure, etc. Usually this step of the reaction is carried out at a temperature ranging from about room temperature up to about 250° C. More often the reaction temperature is 25°–200° C. and most often ranges from about 50° C. to about 150° C. The time of reaction likewise may be considerably varied from say about ¼ to about 24 hours. More often the reaction is complete in 1–10 hours. Again, the first step of the process may be run at atmospheric, superatmospheric or autogenous pressures. Thus, for example, an autoclave may be used. Usually the pressure ranges from about 5 to about 500 psig. More often the pressure is 5–100 psig.

The allyl ether then in turn is reacted with sulfur dioxide and sodium hydroxide or other sources of bisulfite ion to produce the desired ether sulfonates. The ranges of time, temperature and pressure applicable to the first step of the process are also applicable here. This step of the process is preferably carried out in the presence of an aqueous media wherein about 50 percent or more of the solvent is composed of water on a weight basis. Suitable water miscible organic solvents for such a co-solvent system include methanol, ethanol, isopropanol, and other solvents of this type.

This latter step is typically conducted at a pH range of about 1 to 7. The pH influences the ratio of mono to disulfonate (sulfinate included) formed. At a pH of 4, the mono/disulfonate ratio is about 40/60 but at a pH of 7 the ratio is reversed to about 60/40. Reaction is much more rapid at low pH (1 hour or less at pH 4 vs. 6 hours at pH 7), and catalyst consumption is significantly lower. Functionally, there is little difference between products rich in monosulfonates and those rich in disulfonates. Isopropyl alcohol or other co-solvent present is normally removed before the optional step.

A step may be carried out wherein any sulfinates are oxidized to sulfonates. This step is illustrated as follows:

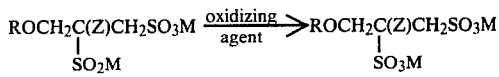

wherein R is a hydrocarbon group having from about 6 to about 24 carbon atoms. The hydrocarbon group may be either paraffinic or aromatic and includes straight chained or branched alkyl groups, alkaryl groups, arylalkyl groups and alkylarylalkyl groups. Linear alkyl groups having from 6 to 18 carbon atoms are preferred and alkyl groups of 10 to 14 carbon atoms are most preferred. Z is hydrogen or a methyl group. M is an alkali metal, alkylammonium or ammonium cation. Sodium is the preferred alkali metal.

A preferred oxidizing agent is hydrogen peroxide. Any other suitable oxidizing agent, for example chlorine, may be used.

The following examples typically illustrate a method of preparing ether sulfonates. It is understood, of course, that these examples are merely illustrative and that the invention is not to be limited thereto.

Step A

One mole of an appropriate alcohol (or hydroxy compound), 1.6 moles (60% excess) of allyl chloride (or halide), and 2.9 moles (190% excess) of sodium hydroxide (base) are charged to a reactor or pressure vessel equipped with an internal agitator.

One more percent of a suitable phase transfer catalyst such as tetrabutylammonium chloride, tributylmethylammonium chloride or any other suitable catalyst is added to the mixture.

The mixture is vigorously stirred while heating to about 110° C.–120° C. for about 3 hours at an autogenous pressure of about 50 psig.

Reactor pressure is carefully released or vented and, while still heated, by-product diallyl ether and unreacted allyl chloride are recovered by distillation.

While still hot and before the sodium hydroxide/sodium halide (chloride) mixture solidifies, sufficient water is added to produce about a 20 percent salt solution. The product layer of alkyl allyl ether of about 95 percent purity floats on the surface and is collected.

If desired, the product can be further purified by vacuum distillation.

The foregoing procedure of Step A may be represented by the following equation:

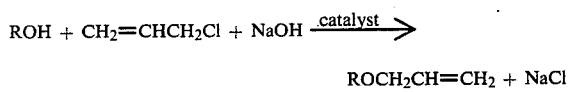

Step B

A 10% aqueous solution of sodium hydroxide containing 1.0 moles of sodium hydroxide is prepared in an alkali resistant vessel.

Sufficient sulfur dioxide is added to adjust the pH to the desired range, e.g. 0.86 moles gives a pH of about 6.8 and 2.0 moles gives a pH of about 4.0.

Isopropyl alcohol is added in an amount approximately equal to the volume of water in the solution.

One mole of the appropriate alkyl allyl ether (product of Step A) is added.

The reactor or vessel is heated to reflux under nitrogen at ~80° C.

About 0.02 moles of a suitable catalyst such as t-butyl perbenzoate is added. Any other suitable catalyst may be used.

The reaction mixture is vigorously stirred. The system is two-phase. The pH is monitored. After an induction period of about 30 minutes to one hour, a slow rise in pH is noted. As the reaction progresses sulfur dioxide is added to control the pH. The reaction is usually complete in about 2 to 3 hours.

After the reaction is complete, using atmospheric distillation, isopropyl alcohol is distilled off and recovered.

Since product composition is controlled by pH, the final pH ranges from about 3 to 7.

The foregoing procedure of Step B may be represented by the following equation:

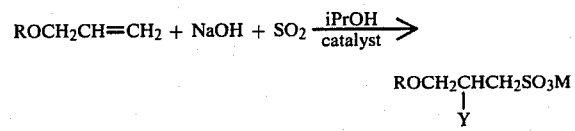

wherein Y=H and SO$_2$Na.

Under these conditions, i.e. a pH range of 4 to 7, a product containing both an alkyl ether monosulfonate and an alkyl ether sulfinate/sulfonate is formed.

A nitrogen blanket is preferably used to prevent any undesirable side reactions.

If desired, the product of Step B may be treated with an oxidizing agent to convert any sulfinate groups to the corresponding sulfonate group as described in Step C, hereinafter.

Step C

At atmospheric pressure, the product of Step B is treated with hydrogen peroxide or other suitable oxidizing agent. If further concentration of product is desired, residual water may be removed by distillation.

The procedure may be illustrated by the following equation:

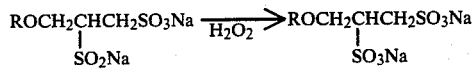

Sulfonate solutions prepared as described in the following examples and comparative samples were tested using the following procedure.

To a 4-ounce bottle was added 5.0 grams of petroleum sulfonate (Petrostep 425 or 450 of Stepan Chemical Company) which is a petroleum sulfonate of 425 or 450 equivalent molecular weight range.

Then one gram of hexanol ethoxylate averaging 2.5 ethoxy groups per molecule was added.

Next, 1.0 grams (active basis) of the ether sulfonate composition or comparative material was added preferably as an aqueous solution of 10–40 percent concentration, or as 100 percent active material.

Next, the appropriate amount of sodium chloride was added preferably as a 10 percent aqueous solution to give the desired final concentration of salt (brine).

Similarly, the appropriate amount of calcium ion was added preferably as a 1 percent solution of calcium ion prepared as calcium chloride.

The sample was then adjusted to 100 grams to provide the desired concentration of the ingredients. The sample was then heated and stirred vigorously in a sealed system to prevent evaporation of any of the components and when dispersion or dissolution was complete the samples were placed in an environment of the desired temperature and observed after 24 hours or more. Observations were made as to the stability or instability of the system. Instability in general is a definite and easily visible phase separation so that a curd of water-insoluble material separates either at the bottom or the top depending on the brine concentrations. Generally, all solutions are opaque. Satisfactory conditions are stable dispersions. Those which showed good results were tested further by dilution with the appropriate sodium chloride and calcium ion solutions at proportions of 1:1, 1:2, 1:5 and 1:10, and reexamined at the indicated temperatures for stability or instability. Samples were tested with 1, 3, 5 and 7 percent by weight of sodium chloride and with 200, 500, 1000 and 2000 parts per million of calcium ion. Data are shown for the various contents of sodium chloride and calcium ion.

A series of tests were conducted to show the performance of the compositions of the invnetion. These tests are designed to show stability in brines and stability in the presence of polymers used as mobility improvers.

A series of solutions were prepared to determine their stability. Stability was measured by allowing the solutions to stand for 24 hours and then observing whether they remained in one phase (stable) or had separated into two phases (unstable). The solutions were prepared by vigorously mixing the ingredients until a single phase was formed.

Solutions of ether sulfonates along with commercially available petroleum sulfonates and ethers were added to brine solutions of various strengths and containing various amounts of $Ca^{++}$.

Solutions (amounts in weight percent) tested were as follows:

```
1. 5% Petrostep 420
   1% Hexanol 2.0 EO
   1% Alkyl ether glyceryl sulfonate
2. 5% Petrostep 450
   1% Hexanol 2.5 EO
   1% Alkyl ether glyceryl sulfonate
```

Petrostep 420 and Petrostep 450 are commercially available (Stepan Chemical) petroleum sulfonates having an average molecular weight of 420 and 450, respectively.

Hexanol 2.0EO and 2.5EO are polyethylene glycol hexyl ethers in which the number of ethylene groups (i.e. the poly) average 2.0 and 2.5, respectively.

Ether sulfonates tested had the following composition:

$ROCH_2CH_2CH_2SO_3Na$ (40%–60%)
+

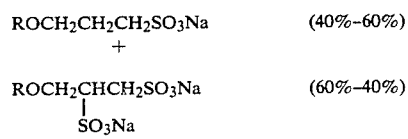
(60%–40%)

wherein R = a $C_{10}$ alkyl group; a $C_{12}$ alkyl group; a $C_{14}$ alkyl group; a $C_{16}$ alkyl group; a mixture of $C_{10}$, $C_{12}$ and $C_{14}$ alkyl groups and the composition has a low pH of about 4 to a high pH of about 7.

All tests were conducted at 75° F.

EXAMPLE 1

Solution 1 with R = $C_{12}$ at low pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Stable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Stable |
| 1 | 2000 | Stable |
| 3 | 2000 | Stable |
| 5 | 2000 | Stable |
| 7 | 2000 | Stable |

EXAMPLE 2

Solution 1 with R = $C_{16}$ at low pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Stable |
| 7 | 500 | Unstable |
| 1 | 1000 | Stable |
| 3 | 1000 | Stable |
| 5 | 1000 | Unstable |
| 7 | 1000 | Unstable |

EXAMPLE 3

Solution 1 with R = $C_{12}$–$C_{13}$

| % NaCl | $Ca^{++}$ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Unstable |
| 7 | 500 | Unstable |
| 1 | 1000 | Stable |
| 3 | 1000 | Stable |
| 5 | 1000 | Unstable |
| 7 | 1000 | Unstable |
| 1 | 2000 | Stable |
| 3 | 2000 | Unstable |
| 5 | 2000 | Unstable |
| 7 | 2000 | Unstable |

EXAMPLE 4

Solution of Example 3

| % NaCl | $Ca^{++}$ ppm | Stability Test |
|---|---|---|
| 1 | 2000 | Stable |
| 3 | 2000 | Stable |
| 5 | 2000 | Stable |
| 7 | 2000 | Unstable |
| 7 | 1000 | Stable |

| % NaCl | Ca++ ppm | Stability Test |
|---|---|---|
| 7 | 500 | Stable |
| 7 | 200 | Stable |

EXAMPLE 5

Solution 1 with R=$C_{12}$–$C_{13}$

| % NaCl | Ca++ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Stable |
| 7 | 500 | Unstable |
| 1 | 1000 | Stable |
| 3 | 1000 | Stable |
| 5 | 1000 | Unstable |
| 7 | 1000 | Unstable |
| 1 | 2000 | Stable |
| 3 | 2000 | Stable |
| 5 | 2000 | Unstable |
| 7 | 2000 | Unstable |

EXAMPLE 6

Solution of Example 5

| % NaCl | Ca++ ppm | Stability Test |
|---|---|---|
| 7 | 200 | Unstable |
| 7 | 500 | Unstable |
| 7 | 1000 | Unstable |
| 7 | 2000 | Unstable |
| 5 | 2000 | Unstable |

EXAMPLE 7

Solution 2 with R=$C_{10}$–$C_{12}$–$C_{14}$ at a high pH

| % NaCl | Ca++ ppm | Stability Test |
|---|---|---|
| 1 | 200 | Stable |
| 3 | 200 | Stable |
| 5 | 200 | Stable |
| 7 | 200 | Stable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Stable |
| 1 | 2000 | Stable |
| 3 | 2000 | Stable |
| 5 | 2000 | Stable |
| 7 | 2000 | Unstable |

EXAMPLE 8

Solution 2 with R=$C_{10}$–$C_{12}$–$C_{14}$ at a low pH

| % NaCl | Ca++ ppm | Stability Test |
|---|---|---|
| 1 | 200 | Stable |
| 3 | 200 | Stable |
| 5 | 200 | Stable |
| 7 | 200 | Stable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Stable |
| 1 | 2000 | Stable |
| 3 | 2000 | Stable |
| 5 | 2000 | Stable |
| 7 | 2000 | Stable |

EXAMPLE 9

Solution 2 with R=$C_{12}$ at a high pH

Results were identical to those of Example 7.

EXAMPLE 10

Solution 2 with R=$C_{10}$–$C_{12}$–$C_{14}$ (Avg. $C_{12}$) at a high pH

| % NaCl | Ca++ ppm | Stability Test |
|---|---|---|
| 1 | 200 | Stable |
| 3 | 200 | Stable |
| 5 | 200 | Stable |
| 7 | 200 | Stable |
| 7.5 | 200 | Stable |
| 8 | 200 | Unstable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Stable |
| 1 | 2000 | Stable |
| 3 | 2000 | Stable |
| 5 | 2000 | Stable |
| 7 | 2000 | Stable |
| 1 | 2200 | Stable |
| 3 | 2200 | Unstable |
| 5 | 2200 | Unstable |
| 7 | 2200 | Unstable |
| 1 | 2400 | Stable |
| 3 | 2400 | Unstable |
| 5 | 2400 | Unstable |
| 7 | 2400 | Unstable |
| 1 | 2800 | Unstable |

EXAMPLE 11

Solution 2 with R=$C_{10}$ at a high pH

| % NaCl | Ca++ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Unstable |
| 7 | 500 | Unstable |
| 1 | 1000 | Stable |
| 3 | 1000 | Unstable |
| 5 | 1000 | Stable |
| 7 | 1000 | Unstable |
| 1 | 2000 | Stable |
| 3 | 2000 | Stable |
| 5 | 2000 | Unstable |
| 7 | 2000 | Unstable |

EXAMPLE 12

Solution 2 with $R=C_{10}$ at low pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Unstable |
| 7 | 500 | Unstable |
| 1 | 1000 | Stable |
| 3 | 1000 | Stable |
| 5 | 1000 | Unstable |
| 7 | 1000 | Unstable |
| 1 | 2000 | Stable |
| 3 | 2000 | Unstable |
| 5 | 2000 | Unstable |
| 7 | 2000 | Unstable |

EXAMPLE 13

Solution 2 with $R=C_{14}$ at a high pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Stable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Unstable |
| 1 | 2000 | Stable |
| 3 | 2000 | Stable |
| 5 | 2000 | Unstable |
| 7 | 2000 | Unstable |

EXAMPLE 14

Solution 2 with $R=C_{14}$ at a low pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Stable |
| 7 | 500 | Unstable |
| 1 | 1000 | Stable |
| 3 | 1000 | Stable |
| 5 | 1000 | Unstable |
| 7 | 1000 | Unstable |
| 1 | 2000 | Unstable |
| 3 | 2000 | Stable |
| 5 | 2000 | Unstable |
| 7 | 2000 | Unstable |

EXAMPLE 15

Solution 2 with $R=C_{10}-C_{12}-C_{14}$ (Avg. $C_{11}$) at a low pH

| % NaCl | $Ca^{++}$ ppm | Stability Test |
|---|---|---|
| 1 | 200 | Stable |
| 3 | 200 | Stable |
| 5 | 200 | Stable |
| 7 | 200 | Stable |
| 1 | 500 | Stable |
| 3 | 500 | Stable |
| 5 | 500 | Stable |
| 7 | 500 | Stable |
| 1 | 1000 | Stable |
| 3 | 1000 | Stable |
| 5 | 1000 | Stable |
| 7 | 1000 | Stable |
| 1 | 2000 | Stable |
| 3 | 2000 | Stable |
| 5 | 2000 | Stable |
| 7 | 2000 | Unstable |

EXAMPLE 16

Solution 2 with $R=C_{10}-C_{12}-C_{14}$ (Avg. $C_{12}$) at a high pH ($C_{10}=25\%$; $C_{12}=50\%$; $C_{14}=25\%$)

Results were the same as those in Examples 15.

EXAMPLE 17

Solution 2 with $R=C_{10}-C_{12}-C_{14}$ (Avg. $C_{13}$)

| % NaCl | $Ca^{++}$ ppm | Stability Test |
|---|---|---|
| 1 | 200 | Stable |
| 3 | 200 | Stable |
| 5 | 200 | Stable |
| 7 | 200 | Unstable |
| 1 | 500 | Stable |
| 3 | 500 | Stable |
| 5 | 500 | Stable |
| 7 | 500 | Unstable |
| 1 | 1000 | Stable |
| 3 | 1000 | Stable |
| 5 | 1000 | Stable |
| 7 | 1000 | Unstable |
| 1 | 2000 | Stable |
| 3 | 2000 | Stable |
| 5 | 2000 | Unstable |
| 7 | 2000 | Unstable |

EXAMPLE 18

Solution of Example 16

| % NaCl | $Ca^{++}$ ppm | Stability Test |
|---|---|---|
| 1 | 200 | Stable |
| 3 | 200 | Stable |
| 5 | 200 | Stable |
| 7 | 200 | Stable |
| 1 | 2000 | Stable |
| 3 | 2000 | Stable |
| 5 | 2000 | Stable |
| 7 | 2000 | Stable |

The foregoing disclosure and description of the invention is illustrative and explanatory thereof and various changes in the illustrated process may be made within the scope of the appended claims without departing from the spirit of the invention.

What is claimed is:

1. A method for obtaining oil from a subterranean oil-bearing formation, which method comprises contacting the formation with an aqueous solution containing an effective amount of a compound having the following structural formula:

ROCH$_2$C(Y)(Z)CH$_2$SO$_3$M wherein R is a hydrocarbon group having from about 6 to about 24 carbon atoms; Y is SO$_2$M or SO$_3$M; Z is hydrogen or a methyl group; M is an alkali metal, alkylammonium or ammonium cation, and then recovering at least a part of the available oil.

2. A method as claimed in claim 1, wherein R is selected from the group consisting of an alkyl group having from 6 to 18 carbon atoms, an alkaryl group having from 6 to 24 carbon atoms, or an arylalkyl group having from 6 to 24 carbon atoms.

3. A method as claimed in claim 1, wherein M is an alkali metal.

4. A method as claimed in claim 1, wherein the said compound is a mixture of the following compounds:

C$_{10-14}$H$_{21-29}$OCH$_2$CH$_2$CH$_2$SO$_3$Na and

C$_{10-14}$H$_{21-29}$OCH$_2$CHCH$_2$SO$_3$Na
　　　　　　　　　　　|
　　　　　　　　　　SO$_3$Na

5. A method as claimed in claim 1, wherein the said compound is a mixture of the following compounds:

C$_{10-14}$H$_{21-29}$OCH$_2$CHCH$_2$SO$_3$Na
　　　　　　　　　　　|
　　　　　　　　　　SO$_2$Na and C$_{10-14}$H$_{21-29}$OCH$_2$CHCH$_2$SO$_3$Na
　　　　　　　　　　　|
　　　　　　　　　　SO$_3$Na 6. A method as claimed in claim 1, wherein the composition also contains sodium chloride.

7. A method as claimed in claim 1, wherein the composition is a saline solution containing 0.5 to 15 percent by weight based on the solution of a surfactant salt of an organic sulfonate other than an organic sulfonate compound of claim 1, 0.25 to 10 percent by weight based on the solution of a polyalkylene glycol alkyl ether and 0.25 to 10 percent by weight based on the solutin of a compound as defined in any one of claims 1 to 5.

8. A method as claimed in claim 1, wherein oil recovery is effected by flooding the formation with a saline solution.

9. A method as claimed in claim 8, wherein the saline solution contains a polymer to improve the mobility thereof.

10. A method as claimed in claim 9, wherein the polymer is a polysaccharide.

11. A method of recovering oil from a subterranean oil-bearing formation which comprises:
    A. injecting into the formation a saline solution containing a mixture of the following components:
        (a) 0.25-10 percent by weight based on said solutin of a salt of the formula

ROCH$_2$C(Y)(Z)CH$_2$SO$_3$M wherein R is a hydrocarbon group having from about 6 to about 24 carbon atoms; Y is SO$_2$M or SO$_3$M; Z is hydrogen or a methyl group; M is an alkali metal, alkylammonium or ammonium cation,
        (b) 0.25-10 percent by weight based on said solution of a polyalkylene glycol alkyl ether, and
        (c) 0.5-15 percent by weight based on said solution of a surfactant salt of an organic sulfonate other than the salt of an organic sulfonate set forth in (a), and
    B. flooding the formation with a saline solution to effect oil recovery therefrom.

12. The method according to claim 11, wherein Component (a) is an alkyl ether sulfonate and Component (b) is diethylene glycol hexyl ether and Component (c) is an alkali metal salt of a petroleum sulfonate.

13. The method according to claim 12, wherein the amounts of Components (a), (b) and (c) respectively are 1-8 percent, 1-8 percent and 2-10 percent.

14. The method according to claim 11, wherein the saline solution in Step "B" contains a polymer to improve the mobility thereof.

15. The method according to claim 12, wherein said polymer is a polysaccharide.

16. As a composition of matter, a saline solution containing a mixture of the following components:
    (a) 0.25-10 percent by weight based on said solution of a salt of the formula

ROCH$_2$C(Y)(Z)CH$_2$SO$_3$M wherein R is a hydrocarbon group having from about 6 to about 24 carbon atoms; Y is SO$_2$M or SO$_3$M; Z is hydrogen or a methyl group; M is an alkali metal, alkylammonium or ammonium cation,
    (b) 0.25-10 percent by weight based on said solution of a polyalkylene glycol alkyl ether, and
    (c) 0.5-15 percent by weight based on said solution of a surfactant salt of an organic sulfonate other than the salt of an organic sulfonate set forth in (a).

* * * * *

UNITED STATES PATENT AND TRADEMARK OFFICE
CERTIFICATE OF CORRECTION

PATENT NO. : 4,643,253

DATED : FEBRUARY 17, 1987

INVENTOR(S) : LAWRENCE H. SHEPHERD, JR. ET AL.

It is certified that error appears in the above-identified patent and that said Letters Patent is hereby corrected as shown below:

Column 2, line 57 reads "intefacial" and should read -- interfacial -- .

Column 3, line 26 reads "injectin" and should read -- injection -- .

Column 3, line 33 reads "ppolysaccharide" and should read -- polysaccharide -- .

Column 4, line 2 reads "$SO_2$" and should read -- $SO_3$ -- .

Column 7, line 15 reads "$ROCH_2C=CH_2$" and should read -- $ROCH_2CH=CH_2$ -- .

Column 9, line 30 reads "more" and should read -- mole -- .

Column 10, line 21 reads "$SO_3M$" and should read -- $SO_3Na$ -- .

Column 11, line 22 reads "invnetion" and should read -- invention -- .

UNITED STATES PATENT AND TRADEMARK OFFICE
CERTIFICATE OF CORRECTION

PATENT NO. : 4,643,253

DATED : FEBRUARY 17, 1987

INVENTOR(S) : LAWRENCE H. SHEPHERD, JR. ET AL.

It is certified that error appears in the above-identified patent and that said Letters Patent is hereby corrected as shown below:

Column 17, line 51 reads "solutin" and should read -- solution -- .

Column 18, line 10 reads "solutin" and should read -- solution -- .

Signed and Sealed this

Twenty-second Day of September, 1987

Attest:

DONALD J. QUIGG

Attesting Officer     Commissioner of Patents and Trademarks